M. ROSENTHAL.
STRETCHER CARRIER FOR BICYCLES.
APPLICATION FILED DEC. 3, 1917.
1,316,332.
Patented Sept. 16, 1919.
3 SHEETS—SHEET 1.
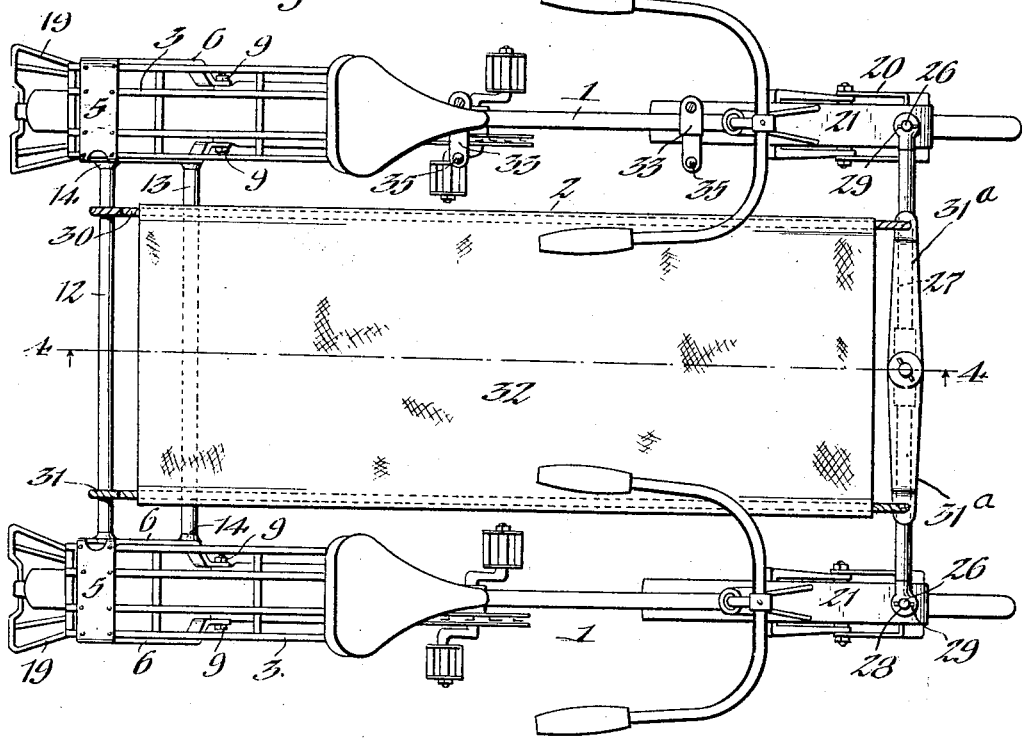
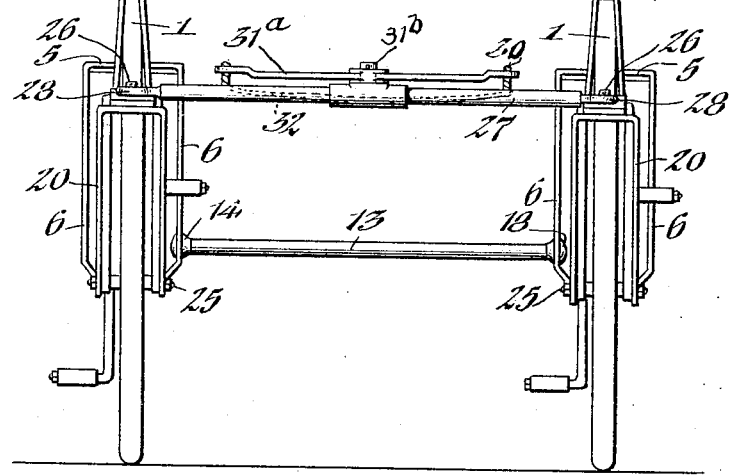

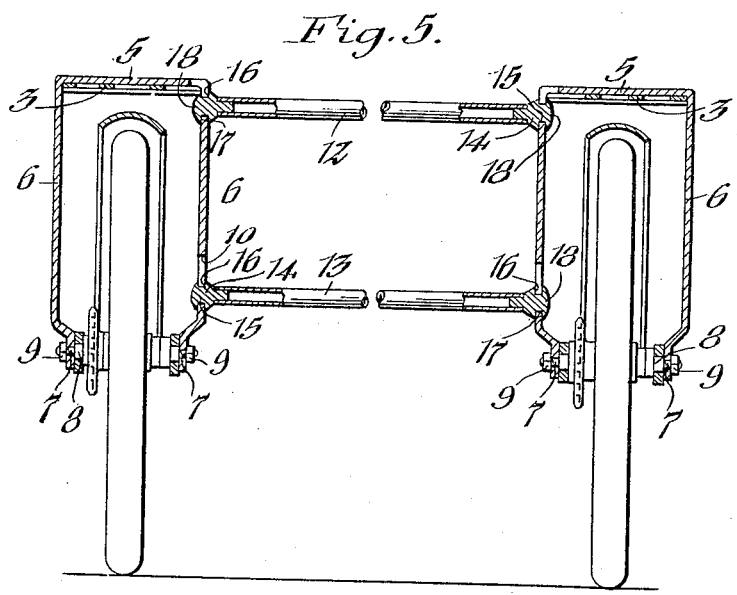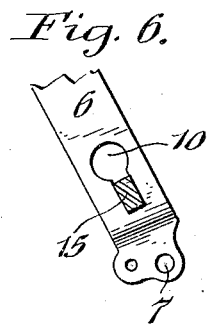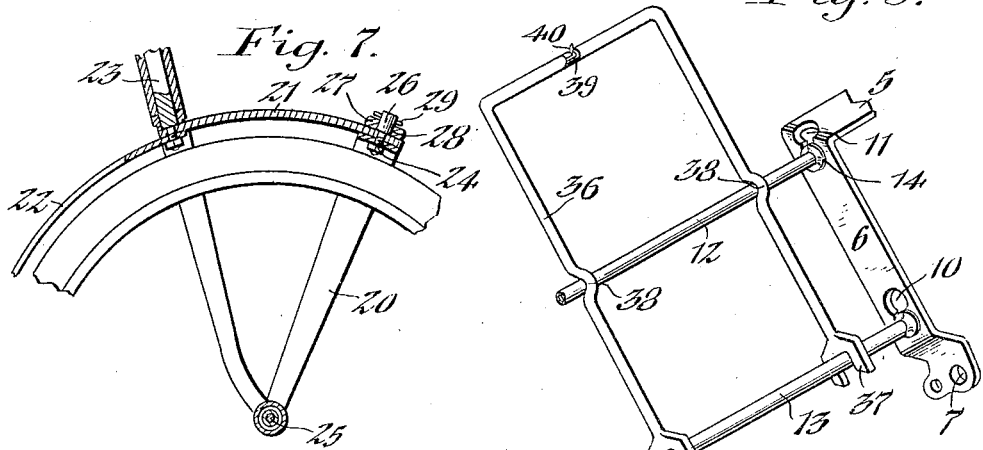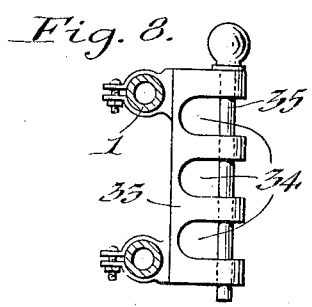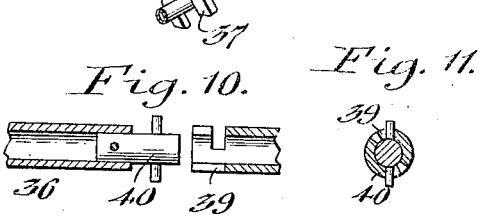

UNITED STATES PATENT OFFICE.

MORRIS ROSENTHAL, OF BUFFALO, NEW YORK.

STRETCHER-CARRIER FOR BICYCLES.

1,316,332. Specification of Letters Patent. Patented Sept. 16, 1919.

Application filed December 3, 1917. Serial No. 205,071.

*To all whom it may concern:*

Be it known that I, MORRIS ROSENTHAL, a citizen of the United States, residing at Buffalo, in the county of Erie and State of New York, have invented new and useful Improvements in Stretcher-Carriers for Bicycles, of which the following is a specification.

This invention relates to a stretcher carrying apparatus for transporting sick or wounded persons, and designed more particularly for use in connection with bicycles, motorcycles and the like.

One of the objects of my invention is to provide an apparatus of this character which can be readily applied to bicycles of ordinary construction.

Another object of the invention is to construct an apparatus which can be quickly and conveniently assembled and dismembered and which is free from screws, bolts and nuts for holding the several parts together.

A further object is to produce an apparatus that is simple, yet strong and durable in construction, and which can be produced at low cost.

Figure 3:
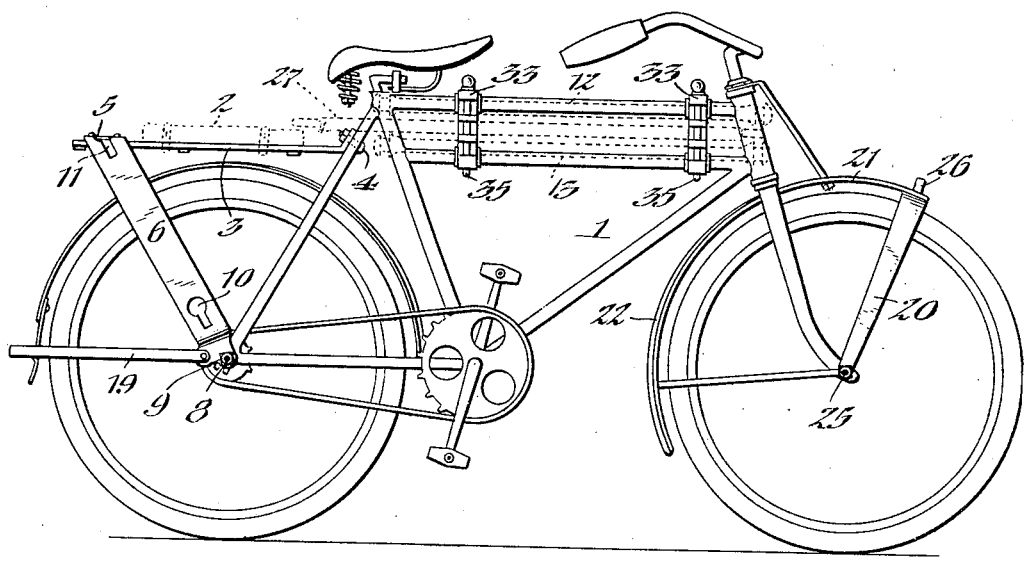
Figure 4:
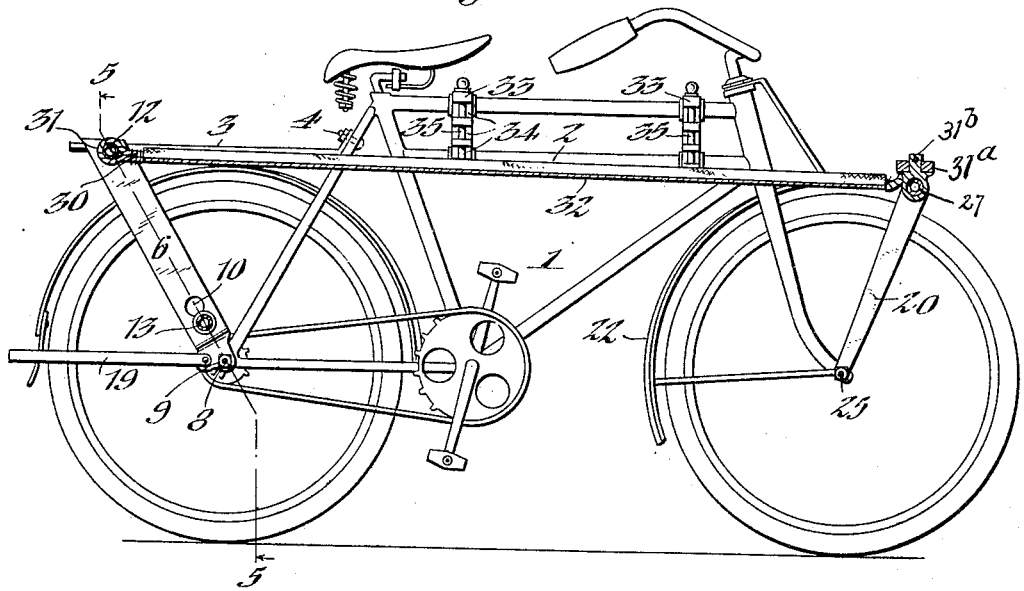

In the accompanying drawings: Figure 1 is a top plan view of a pair of bicycles equipped with my improved stretcher carrying apparatus. Fig. 2 is a front view thereof. Fig. 3 is a side elevation of a bicycle equipped with my improvements, showing the stretcher removed therefrom. Fig. 4 is a longitudinal section on line 4—4, Fig. 1. Fig. 5 is a transverse vertical section taken on line 5—5, Fig. 4. Fig. 6 is an enlarged fragmentary sectional view of the rear supporting bracket. Fig. 7 is a fragmentary sectional view, showing the front supporting brackets and associated parts. Fig. 8 is an enlarged sectional elevation of one of the brackets for carrying the stretcher supporting rods when not in use. Fig. 9 is a fragmentary perspective view of a modified form of my invention for supporting the rear portion of the stretcher. Fig. 10 is an enlarged fragmentary sectional view showing the means for disconnecting the upper portion of the supporting device. Fig. 11 is a cross section of the same with the parts in their locked position.

Similar characters of reference indicate corresponding parts throughout the several views.

In its general organization, this apparatus consists of a pair of bicycles or motorcycles arranged side by side in spaced parallel relation to each other and removable supporting rods or tie bars at their front and rear ends to which a stretcher is attached.

Referring now to Figs. 1–7, which show my improvement as applied to a pair of bicycles, although the same is also applicable to motor cycles and similar vehicles, 1, 1, indicate the bicycles arranged side by side. They are spaced sufficiently apart to permit of conveniently disposing a stretcher 2 between them. Arranged over the rear wheel of each bicycle is the customary luggage carrier 3 which is fastened to the rear truss bars of the bicycle by means of a bolt 4.

For the purpose of supporting the stretcher between the bicycles at its front and rear ends, each bicycle is equipped with means which are preferably constructed as follows:

5 indicates an inverted U-shaped supporting yoke or bracket located at the rear end of the bicycle and embracing the rear end of the luggage carrier 3 to which it is secured, while its lower depending sides or legs 6, 6, embrace the lower ends of the rear truss bars and are provided with openings 7, 7, which are adapted to engage the opposite ends of the rear axle 8 and are retained thereon by nuts 9, 9. This bracket is inclined forwardly, as shown in Figs. 1 and 2, and its inner leg is provided at its lower end and above the axle with a key hole slot 10, while its upper end is provided with a similar keyhole slot 11, for a purpose to be presently described. The longitudinal axis of these slots is preferably inclined in the general direction of the bracket, as shown.

Arranged horizontally and transversely between the companion inner sides of the rear brackets of the bicycles are upper and lower supporting rods or tie bars 12, 13, the upper tie bar serving to support one end of the stretcher while the lower tie bar serves to keep the bicycles in perfect alinement and rigidly connected with each other just above the axle 8. Each of these tie bars is preferably of tubular form, their outer ends being provided with solid heads 14, 14, which are brazed or otherwise secured to these bars. Each head is grooved adjacent its end to form a shank 15 adapted to engage the corresponding contracted portion of the companion keyhole slot, and is preferably of rectangular cross section, as shown in Fig. 6, and of a width equal to the thickness of the corresponding bracket. The shoulders 16, 17 formed on either side of each shank bear against opposite sides of the corresponding bracket and thereby prevent lateral displacement of the tie bar and at the same time reliably hold the bicycles in their desired spaced parallel position. The enlargements 18 on the ends of each tie bar are of such a diameter as to pass freely through the enlarged portions of the keyhole slots to permit of the ready insertion and removal of these bars during assembling and dismembering of the parts.

To the lower rear portion of each rear bracket 5 is pivoted the customary stand 19 for supporting the bicycle when the stretcher apparatus is not in use.

20 indicates a front inverted U-shaped supporting yoke or bracket which is inclined rearwardly and whose upper end is secured to a reinforcing segment 21 which serves also as a continuation of the mud guard 22 and is of the same curvature, as shown in Fig. 7. The rear end of this segment is bolted to the lower end of the steering post 23 while its forward end is fastened to the bracket 20 by means of a bolt 24. The side portions of this bracket are bolted to the opposite sides of the front axle 25. The upper ends of the bolts 24 preferably terminate in vertical studs or pivot pins 26 to which the free ends of the front tie bar 27 are connected. The ends of this tie bar are provided with eyes or openings 28 which are adapted to fit over the corresponding pivot pins 26 of the bicycles and are held from vertical displacement by cotters 29 or other suitable means. By this construction it is possible to steer the two bicycles simultaneously and conveniently, and if occasion permits, only one operator is required to control the two bicycles. This front tie bar not only forms a swiveling coupling or connection between the front wheels of the bicycles, but also serves as the front support for the stretcher.

The stretcher which is disposed between the front and rear tie bars may be of any appropriate construction, but that shown in the drawings has been found suitable and comprises two flexible longitudinal sections or lengths 30, 30, of rope or other similar material arranged horizontally and parallel to each other. The rear ends of these ropes are removably attached to the upper rear tie bar 12 preferably by providing them with loops 31, as shown in Fig. 4. The front ends of these ropes are attached to opposite ends of a horizontally-swinging bar or lever 31ª pivoted centrally upon a stud 31ᵇ carried by the front tie bar 27. Arranged between and secured to the flexible sections 30, 30, is a canvas sheet 32 which extends practically the full distance between the tie bars. By supporting the front portion of the stretcher upon the swiveling bar 31ª, the coupled bicycles can be easily steered without restraint.

In assembling the apparatus for use, assuming that the ropes 30 of the stretcher are in place on the bars 12 and 31ª, the rear upper and lower tie bars 12, 13, are placed in their respective slots by first passing their enlarged heads through the corresponding openings in the bracket of one of the bicycles. The companion bicycle is then brought sufficiently near to permit of inserting the other end of each tie bar in its respective slot of the companion bracket, thus rigidly coupling the bicycles. The front tie bar is now applied to the pivot pins 26 at the forward ends of the bicycles and the apparatus is ready for service. In dismembering the apparatus, the reversal of the steps previously described is all that is necessary. These steps can be performed easily and conveniently and within a short period of time, which in devices of this character, is very important.

For convenience in transportation, and in the field when the stretcher is not in use, the front and rear tie bars may be carried by a pair of holders 33, 33, secured to the frame in any suitable manner and provided with recesses or notches 34 for receiving said bars. The latter are held securely in these recesses by means of a retaining pin 35 passing through openings in the solid portions of the holders. The stretcher, on such occasions, can be easily rolled up and fastened to the luggage carrier of the bicycle, as shown by dotted lines in Fig. 3.

Referring to Figs. 9–11, which show a modified form of rear support for the stretcher, 36 indicates a forwardly inclined rack preferably formed of two L-shaped sections removably connected at their upper ends. The lower end of each section is provided with a fork 37 which straddles the lower rear tie bar 13 while its intermediate portion is provided with indentations 38 seated upon the upper tie bar 12, as shown in Fig. 9. These sections are removably coupled or connected at their upper ends preferably by means of a bayonet joint, whose members are designated 39, 40 in the drawings.

By using this modified supporting rack at the rear of the vehicle, a stretcher of greater length can be provided than by the first-described construction, without disturbing any of the other parts of the apparatus, this increased length resulting from the fact that the rack extends upwardly and rearwardly beyond the upper rear tie 12.

Furthermore, the construction of this rack is simple and it can be quickly assembled and dismembered and conveniently carried by one of the bicycles when not in use.

I claim as my invention:

1. The combination of a pair of bicycles arranged side by side in spaced parallel relation to each other, a rear tie bar removably arranged transversely between said bicycles and rigidly secured thereto, a front tie bar removably arranged between said bicycles and having a pivotal connection therewith, and a stretcher carried by said front and rear tie bars.

2. The combination of a pair of bicycles arranged side by side in spaced parallel relation to each other and each carrying front and rear brackets, each rear bracket being provided with a keyhole slot, a tie bar arranged between said bicycles and removably arranged in said slots, each front bracket being provided with a pivot pin, a tie bar arranged between the front wheels of said bicycles and removably engaging said pivot pins, and a stretcher carried by said tie bars.

3. The combination of a pair of bicycles arranged side by side in spaced parallel relation to each other and each carrying front and rear brackets, each rear bracket being provided with a keyhole slot, a tie bar arranged between said bicycles and having grooves at its ends adapted to engage the contracted portions of said slots, each front bracket being provided with a pivot pin, a tie bar arranged between the front wheels of the bicycles and removably arranged on said pivot pins, and a stretcher carried by said tie bars.

4. The combination of a pair of bicycles arranged side by side in spaced parallel relation to each other and each carrying front and rear brackets, upper and lower tie bars removably arranged in said rear brackets, a tie bar removably attached to said front bracket and capable of swiveling horizontally in steering the bicycles, and a stretcher carried by said upper rear tie bar and said front tie bar.

5. The combination of a pair of bicycles arranged side by side in spaced parallel relation to each other, upper and lower tie-bars connecting the rear ends of the bicycles, means connecting the front ends of the bicycles, a rack mounted on said upper and lower tie bars, and a stretcher carried by said rack and said front connecting means.

6. The combination of a pair of bicycles arranged side by side in spaced parallel relation to each other, upper and lower tie bars connecting the rear ends of the bicycles, means connecting the front ends of the bicycles, a rack provided at its lower end with forks engaging said lower tie bar and above the forks with indentations seated on said upper tie bar, and a stretcher carried by said rack and said front connecting means.

7. The combination of a pair of bicycles arranged side by side in spaced parallel relation to each other, front and rear tie bars connecting the corresponding portions of the bicycles, a swiveling member mounted on said front tie bar, and a stretcher attached at its ends to the rear tie bar and said swiveling member, respectively.

8. The combination of a pair of bicycles arranged side by side in spaced parallel relation to each other, front and rear tie bars connecting the corresponding portions of the bicycles, a horizontally-swinging lever pivoted between its ends to said front tie bar, and a stretcher having flexible longitudinal members attached at their rear ends to said rear tie bar and at their front ends to opposite ends of said lever.

MORRIS ROSENTHAL.